US012725302B2

(12) United States Patent
Onishi et al.

(10) Patent No.: US 12,725,302 B2
(45) Date of Patent: Sep. 1, 2026

(54) IMAGE PROCESSING DEVICE AND IMAGE PROCESSING METHOD

(71) Applicants: KYOCERA Corporation, Kyoto (JP); Umemura Educational Institutions, Nagoya (JP)

(72) Inventors: Shosuke Onishi, Yokohama (JP); Manabu Hashimoto, Nagoya (JP)

(73) Assignees: KYOCERA Corporation, Kyoto (JP); Umemura Educational Institutions, Nagoya (JP)

( * ) Notice: Subject to any disclaimer, the term of this patent is extended or adjusted under 35 U.S.C. 154(b) by 246 days.

(21) Appl. No.: 18/687,033

(22) PCT Filed: Jul. 8, 2022

(86) PCT No.: PCT/JP2022/027173
§ 371 (c)(1),
(2) Date: Feb. 27, 2024

(87) PCT Pub. No.: WO2023/026706
PCT Pub. Date: Mar. 2, 2023

(65) Prior Publication Data
US 2024/0428450 A1 Dec. 26, 2024

(30) Foreign Application Priority Data
Aug. 27, 2021 (JP) ................................ 2021-139428

(51) Int. Cl.
*G06T 7/73* (2017.01)

(52) U.S. Cl.
CPC .................................... *G06T 7/74* (2017.01)

(58) Field of Classification Search
CPC .... G06T 7/74; G06V 10/751; G06V 2201/06; G06V 10/62; G06V 10/7515; G06V 30/1914
See application file for complete search history.

(56) References Cited

U.S. PATENT DOCUMENTS 9,036,898 B1 * 5/2015 Beeler .................... G06T 19/20 382/154
10,515,291 B2 12/2019 Konishi
(Continued)

FOREIGN PATENT DOCUMENTS

| | | |
|---|---|---|
| JP | 2008-113071 A | 5/2008 |
| JP | 2016-207147 A | 12/2016 |
| WO | 2018/230016 A1 | 12/2018 |

OTHER PUBLICATIONS

Saito et al., "Image matching robust to illumination fluctuations using stable pixels based on concentration co-occurrence analysis", Information Processing Society Research Report. IPSJ SIG Technical Report, vol. 2012-CVIM-182 No. 17, May 23, 2012, Japan, 16 pages.
(Continued)

*Primary Examiner* — Tom Y Lu
(74) *Attorney, Agent, or Firm* — Procopio, Cory, Hargreaves & Savitch LLP

(57) ABSTRACT

This image processing device comprises a memory, a communication unit, and a control unit. The memory stores a group of template images including a plurality of images of a detection object. The communication unit acquires an entire image including a matching object. The control unit acquires a representative image based on a part of the group of template images. The control unit determines a similarity between at least a part of the entire image and the representative image.

17 Claims, 9 Drawing Sheets

(56) References Cited

U.S. PATENT DOCUMENTS

| | | | | |
|---|---|---|---|---|
| 2002/0126895 | A1 | 9/2002 | Satoh | |
| 2010/0189339 | A1 | 7/2010 | Amanullah et al. | |
| 2016/0089783 | A1* | 3/2016 | Noh | G05D 1/0246 901/1 |
| 2018/0260661 | A1* | 9/2018 | Konishi | G06V 10/52 |
| 2020/0074644 | A1 | 3/2020 | Hu et al. | |

OTHER PUBLICATIONS

Saito et al., "Robust image matching based on disturbance pixel estimation using statistical density variation analysis Robust Image Matching based on Estimation of Disturbed Pixels using Statistical Analysis of Intensity Variation", View2013, 2013125-6, Japan, 8 pages.

Shinohara et al., "An Image-Matching Method Using Template Updating Based on Statistical Prediction of Outliner-Pixel", 25 pages, Journal of the Japan Society for Precision Engineering, vol. 83, No. 12, 2017, pp. 1178-1183.

* cited by examiner

STATISTICAL MODEL OF PIXEL VALUES OF PIXELS AT THE SAME ADDRESS

STATISTICAL MODEL OF PIXEL VALUES OF PIXELS INCLUDED IN PIXEL REGION AROUND PIXEL AT GIVEN ADDRESS

STATISTICAL MODEL OF PIXEL VALUES OF PIXELS
IN SECTION INCLUDING GIVEN ADDRESS

IMAGE PROCESSING DEVICE AND IMAGE PROCESSING METHOD

CROSS-REFERENCE TO RELATED APPLICATIONS

The present application claims priority to Japanese Patent Application No. 2021-139428, filed in the Japanese Patent Office on Aug. 27, 2021, the entire contents of which are incorporated herein by reference.

TECHNICAL FIELD

The present disclosure relates to an image processing device and an image processing method.

BACKGROUND OF INVENTION

In any given region, it is required to recognize the position of a detection object from an image. For example, in a factory where the detection object is produced, when the detection object placed on a tray is required to be operated with a robot, recognition of the object's position is essential.

In a known template matching, an image of a detection object is used as a template image, and the position of the detection object is detected from an image of a given region. The appearance of the detection object placed in the given region can be changed from the unvarying template image due to various disturbance factors such as a change in illuminance of sunlight, the position of a camera capturing the image of the given region, and manual operation performed on the detection object. Hence, it has been proposed to perform template matching that is robust against these disturbance factors (refer to Non Patent Literatures 1 to 3).

CITATION LIST

Non Patent Literature

Non Patent Literature 1: Saito, M.; Hashimoto, M.: "*Robust Image Matching for Illumination Variation using Stable Pixels based on Co-occurrence Analysis*", Information Processing Society of Japan Special Interest Group Technical Report, Vol. 2012-CVIM-182, No. 17, 2012.

Non-Patent Literature 2: Saito, M.; Hashimoto, M.: "*Robust Image Matching based on Estimation of Disturbed Pixels using Statistical Analysis of Intensity Variation*", Vision Engineering Workshop (ViEW2013), IS2-D7.

Non Patent Literature 3: Shinohara, N.; Hashimoto, M.: "*An Image-Matching Method using Template Updating based on Statistical Prediction of Outlier-Pixel*", Journal of the Japan Society for Precision Engineering, Vol. 83, Issue 12, pp 11178-1183, 2017.

SUMMARY

In a first aspect, an image processing device includes a memory, an acquisition unit, and a control unit.

The memory is configured to store a template image group including a plurality of images of a detection object.

The acquisition unit is configured to acquire an entire image including a matching object.

The control unit is configured to acquire a representative image based on part of the template image group and perform similarity determination between at least the part of the entire image and the representative image.

In a second aspect, an image processing device includes a memory, an acquisition unit, and a control unit.

The memory is configured to store a template image group including a plurality of images of a detection object.

The acquisition unit is configured to acquire an entire image including a matching object.

The control unit is configured to acquire a representative image based on part of the template image group and perform similarity determination between at least the part of the entire image and the representative image.

The control unit calculates a degree of contribution of part of the entire image used in the similarity determination based on a statistic of at least part of the template image group, and uses the degree of contribution in the similarity determination.

In a third aspect, an image processing method includes storing, acquiring of an entire image, acquiring of a representative image, and performing similarity determination.

The storing stores a template image group including a plurality of images of a detection object.

The acquiring of the entire image acquires the entire image including a matching object.

The acquiring of the representative image acquires the representative image based on part of the template image groups.

The performing performs similarity determination between at least part of the entire image and the representative image.

DESCRIPTION OF EMBODIMENTS

Hereinafter, according to embodiments of the present disclosure, an image processing device is described with reference to the drawings.

Figure 1:
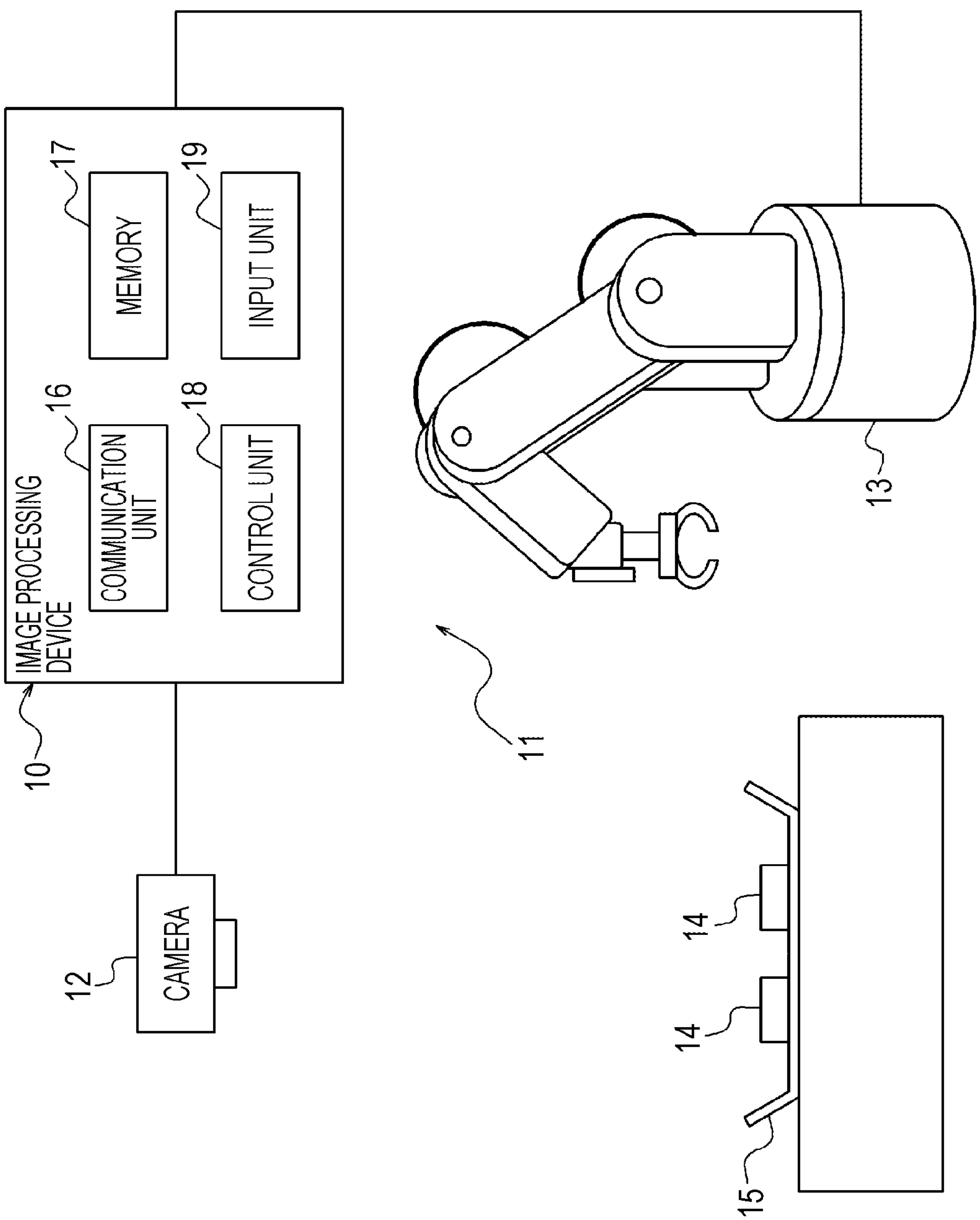
FIG. 1 is a diagram illustrating a configuration example of an object operation system including an image processing device according to a first embodiment.

FIG. 1 illustrates a configuration example of an object operation system 11 including an image processing device 10 according to a first embodiment. The object operation system 11 may include a camera 12, the image processing device 10, and an operation machine 13.

The object operation system 11 performs, for example, a specific operation on a detection object 14 such as a product or the like in a factory or the like. The detection object 14 is, for example, placed on a tray 15 or the like. The camera 12 may capture an image of the tray 15 on which the detection object 14 is placed. The camera 12 may generate the image at, for example, a predetermined frame rate such as 30 fps. In other words, the camera 12 may periodically generate the image. The image processing device 10 may detect a position of the detection object 14 by using the image captured by the camera 12. The operation machine 13 may perform the operation on the detection object 14 at the position detected by the image processing device 10. The operation machine 13 is, for example, a robot. As its operation, the operation machine 13 may grasp the detection object 14.

The image processing device 10 includes a communication unit (acquisition unit) 16, a memory 17, and a control unit 18. The image processing device 10 may further include an input unit 19.

The communication unit 16 acquires an entire image from the camera 12. The image processing device 10 detects the presence position of the detection object 14 in the entire image. Specifically, a subject to serve as a matching object is recorded in the entire image. As will be described later, the matching object is matched against a detection object of a representative image. The communication unit 16 may be, for example, a communication interface configured to communicate information and an instruction with an external machine through communication. The communication unit 16 may provide the operation machine 13 the presence position of the detection object 14 in the entire image.

The memory 17 includes any storage devices including, for example, a random access memory (RAM) and a read access memory (ROM). The memory 17 may store various programs that causes the control unit 18 to function and various types of information used by the control unit 20.

The memory 17 stores a template image group. The template image group includes a plurality of detection object images. The plurality of detection object images may be acquired, for example, along a time series as will be described later. The plurality of detection object images may include, for example, a plurality of detection object images generated from a single image by using a data augmentation process. The plurality of detection object images may include a plurality of detection object images acquired, for example, in a different environment. The present embodiment uses an example of the template image group that includes the plurality of detection object images acquired along a time series. The detection object images refer to images of the detection object 14.

The plurality of detection object images may include a plurality of processed images. Image processing has been performed on each of a subset of the plurality of detection object images to make the plurality of processed images. The control unit 18 may perform the image processing. The image processing is, for example, a brightness adjustment process performed on each of the subset of the plurality of detection object images so as to reflect a change in pixel value in the entirety of each of the detection object images. This change in pixel value is recognized between a plurality of detection object images in the template image group acquired before acquisition of each of the subset of the plurality of detection object images and a plurality of other detection object images in the template image group acquired after the acquisition of each of the subset of the plurality of detection object images. Alternatively, the image processing is, for example, a process of adding disturbance to each of the subset of the plurality of detection object images. This disturbance occurs suddenly in a plurality of detection object images and a plurality of other detection object images acquired before and after the acquisition of each of the subset of the plurality of detection object images.

The input unit 19. may include one or more interfaces configured to detect operation input from a user. The input unit 19 may include, for example, a physical key, an electrostatic capacitance key, and a touch screen provided integrally with a display device.

The control unit 18 includes a memory and one or more processors. The processor may include a general-purpose processor to which a specific program is written to execute a specific function and a dedicated processor customized for a specific process. The dedicated processor may include an application specific integrated circuit (ASICS). The processor may include a programmable logic device (PLD). The PLD may include a field-programmable gate array (FPGA). The control unit 18 may be one of a system-on-a-chip (SoC) and a system in a package (SiP) In the SoC and SiP, a plurality of processors cooperates with each other.

The control unit 18 generates a representative image based on a partial image group extracted from the template image group. Extraction of the partial image group from the template image group and the generation of the representative image will be described later with a detailed example. For example, the control unit 18 may generate the representative image every time the control unit 18 acquires the entire image.

Figure 2:
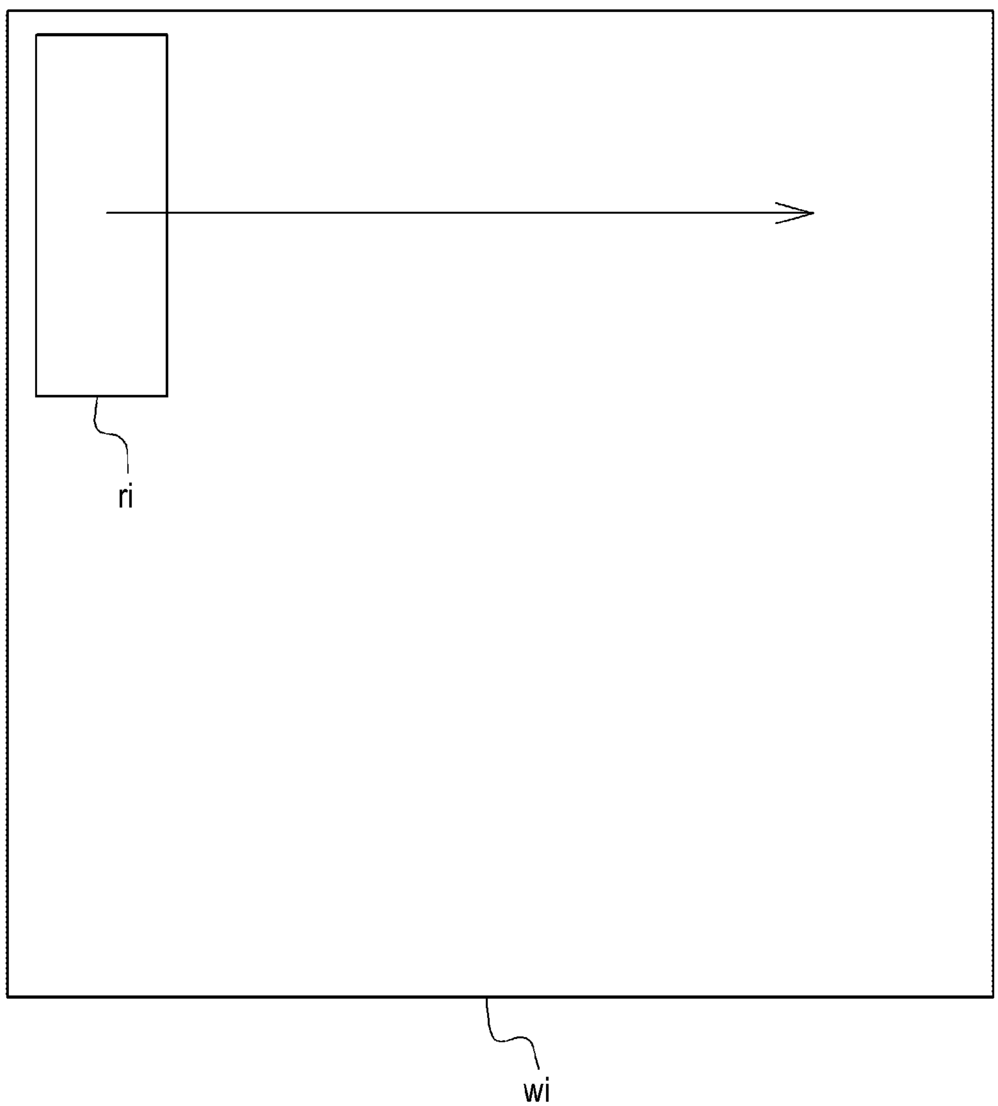
FIG. 2 is a diagram for explaining similarity determination between a representative image and a partial region of an entire image performed by a control unit of FIG. 1 to detect a presence position of a detection object in the entire image.

As illustrated in FIG. 2, the control unit 18 determines similarity between a representative image ri having a size smaller than or equal to the size of an entire image wi and at least a partial region of the entire image wi while superposing the representative image ri on the at least partial region. When analogy determination is performed, it is possible to determine whether the matching object of the entire image wi is the detection object. In an example according to the present embodiment, the representative image ri smaller than the entire image wi is superposed on the partial region of the entire image wi. The similarity determination will be described later with a detailed example. The control unit 18 can detect the presence position of the detection object in addition to, for example, the determination on whether the matching object is the detection object. Specifically, the control unit 18 displaces the partial region of the entire image wi superposed on the representative image ri to perform the similarity determination at positions, thereby detecting the presence position of the detection object 14 in the entire image wi. When the control unit 18 can detect the image of the detection object 14 in the entire image wi, the control unit 18 stores the detected image to the memory 17 so as to include the detected image in the template image group as the detection object image.

The extraction of the partial image group from the template image group is described according to the present embodiment. For example, the control unit 18 may determine a first time point. The first time point is a start time point of a chronological range for acquisition time of the detection object images extracted from the template image group. The first time point may be determined with any method. For example, the first time point may be determined based on time-series changes in influence in appearance occurring in the images included in the template image group. When the input unit 19 detects an operation input that designates the first time point, a time point corresponding to the operation input may be determined as the first time point. Alternatively, the first time point may be determined based on an analysis of the template image group performed by the control unit 18.

The control unit 18 determines the first time point based on, for example, time-series changes in the pixel value of each image included in the template image group. The pixel value of each image may be, for example, a pixel value of a specific pixel included in the image, an average of the pixel values of all the images, an average of the pixel values in a specific range, or the like. More specifically, for example, the control unit 18 calculates a period greater than or equal to twice a period corresponding to a minimum frequency component in the time-series changes in the pixel value and determines a time point going back from the present time point by the calculated period as the first time point.

The control unit 18 may determine the following image group out of the images included in the template image group as a first image group: an image group including a plurality of images acquired in a time period from the first time point going back to the past to a latest time point along a time-series. The control unit 18 may determine sampling intervals of images to further extract images from the first image group. The sampling intervals may be determined by using any method. For example, the sampling intervals may be determined based on the time series changes in influence in appearance occurring in the images included in the template image group. When the input unit 19 detects an operation input that designates the sampling intervals, intervals corresponding to the operation input may be determined as the sampling intervals. Alternatively, the sampling intervals may be determined based on the analysis of the template image group performed by the control unit 18.

The control unit 18 determines the sampling intervals based on, for example, time-series changes in the pixel value of each image included in the template image group. As is the case with the determination of the first time point, the pixel value of each image may be a pixel value of a specific pixel included in the image, an average of the pixel values of all the images, an average of the pixel values in a specific range, or the like. More specifically, for example, the control unit 18 determines a period greater than or equal to twice a period corresponding to a maximum frequency component in the time-series changes in the pixel value as the sampling intervals.

For example, when the pixel value of each image included in the template image group does not change along a time series, the control unit 18 may determine any intervals greater than or equal to a period of acquisition of the detection object images as the sampling intervals. The fact that the absolute value of the difference between the pixel values continuous along the time series is smaller than a first threshold may be regarded as a state in which the pixel value of each image included in the template image group does not change along a time-series. For example, when the pixel value of each image included in the template image group does not change along a time series, the control unit 18 may determine the first time point so that the number of the detection object images detected from the first image group at the above-described sampling intervals exceeds a predetermined number of samples.

The control unit 18 may determine the following image group out of the first image group as a second image group: an image group including a plurality of images acquired at the sampling intervals from the first time point. The control unit 18 may further extract images from the second image group as described below.

For extracting the images, the control unit 18 may determine at least one disturbance factor for the detection object images. Within a predetermined period of time going back from the present time, the presence positions of these detection object images have been detected from the entire image wi, and these detection object images have been included in the template image group. The detection object images which have been detected in presence position within the predetermined period of time going back from the present time and which have been included in the template image group may be the detection object images included in the respective entire images wi of a plurality of frames. Factors of disturbance in the plurality of detection object images respectively corresponding to a plurality of entire images wi may be the same or similar to each other.

The disturbance factors exert influence in appearance. Examples of disturbance factors include, for example, the direction of illumination using sunlight, a change in intensity or the like over time, a change in received color due to a change in position of the camera 12, the presence or absence of labels on the detection object 14 and a difference of labels' position, and changes in illuminance caused by an operator or a robot passing between the illumination and the detection object 14.

The disturbance factors may be determined with any method. For example, when the input unit 19 detects an operation input that designates a situation occurring at a time of exerting influence in appearance in a newly acquired entire image wi, the control unit 18 determines a factor corresponding to the situation as the disturbance factor. The control unit 18 may determine a plurality of disturbance factors when detecting an operation input designating a plurality of situations. Alternatively, a single disturbance factor or the plurality of disturbance factors may be determined based on an analysis of the second image group performed by the control unit 18.

For example, the control unit 18 may generate a comparative image reflecting the disturbance factor, thereby to determine the disturbance factor. The control unit 18 may generate the comparative image by using the detection object image within a predetermined period of time going back from the present. For example, when a single detection object image is used, the comparative image is the detection object image itself. For example, when the plurality of detection object images is used, the comparative image may be generated based on the plurality of detection object images. The comparative image based on the plurality of detection object images may be generated by, for example, averaging the plurality of detection object images or another method.

The control unit 18 may extract an image group of the detection object images corresponding to the determined disturbance factor from the second image group. When the plurality of disturbance factors is determined, the control unit 18 may extract a plurality of image groups of the detection object images corresponding to the respective disturbance factors.

In a configuration in which the disturbance factor is determined based on the operation input detected by the input unit 19, when it is assumed that the situation causing influence in appearance to be exerted is associated with each of the detection object images included in the template image group, the control unit 18 may extract, from the second image group, an image group of the detection object images with which a situation corresponding to the disturbance factor is associated. In a configuration in which the disturbance factor is determined by the analysis of the second image group, the control unit 18 compares each of the detection object images included in the second image group with the comparative image to extract an image group of the detection object images corresponding to the comparative image.

For example, the control unit 18 compares the pixel value of each of the pixels included in the comparative image with the pixel value of each of the pixels included in each of the detection object images included in the second image group, thereby to extract an image group of the detection object images determined to be similar to the comparative image. For example, the control unit 18 performs clustering on the comparative image and the image groups included in the second image group to extract an image group of the detection object images belonging to the same cluster as a cluster to which the comparative image belongs. For example, the control unit 18 performs disturbance determination on all the detection object images included in the second image group to extract an image group of the detection object images including a pixel included in the comparative image and determined to be a disturbance.

The control unit 18 may generate the representative image ri based on the second image group extracted from the template image group or based on the image group corresponding to the disturbance factor further extracted from the second image group. The control unit 18 may generate the representative image ri by using various methods.

For example, the control unit 18 determines a statistic based on the pixel values of the pixels at addresses corresponding to each other among the images included in the second image group as the pixel value of the pixels, thereby to generates the representative image ri. Examples of the statistic include, for example, an average, a mode, and a median.

Figure 3:
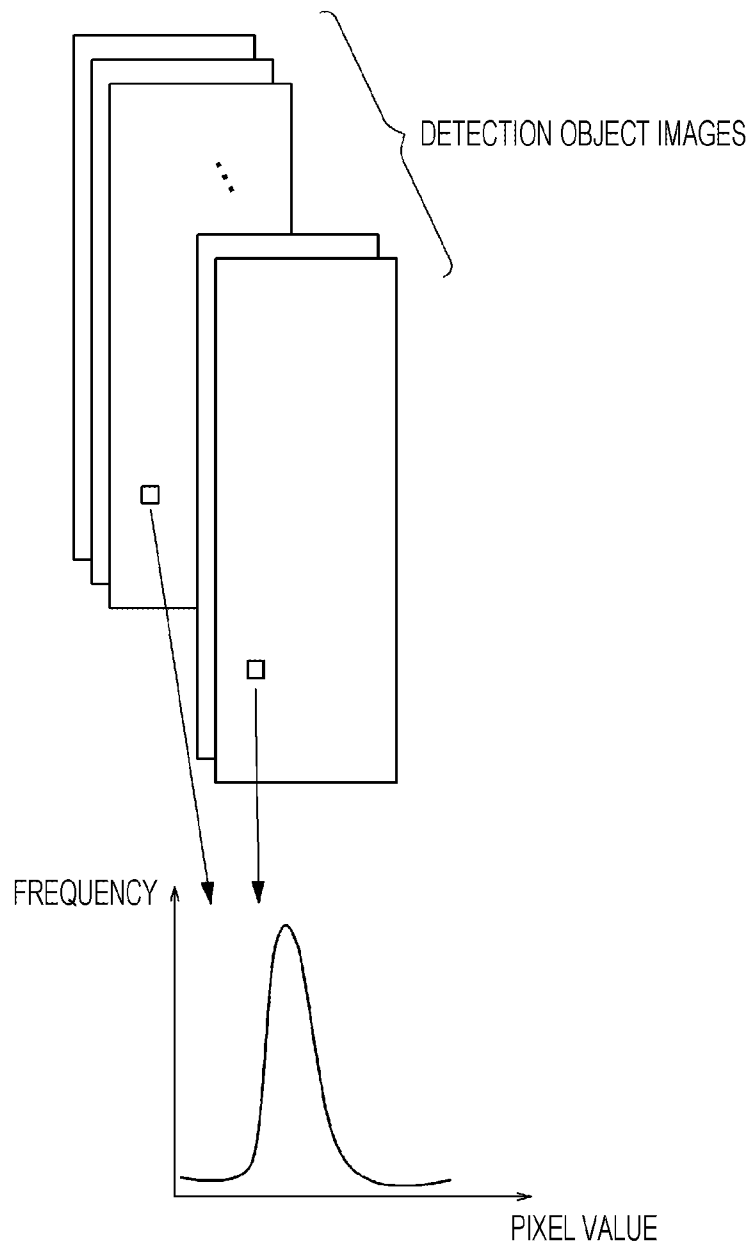
FIG. 3 is a diagram for explaining a method for creating a statistical model for calculation of the degree of contribution performed by the control unit of FIG. 1.
Figure 4:
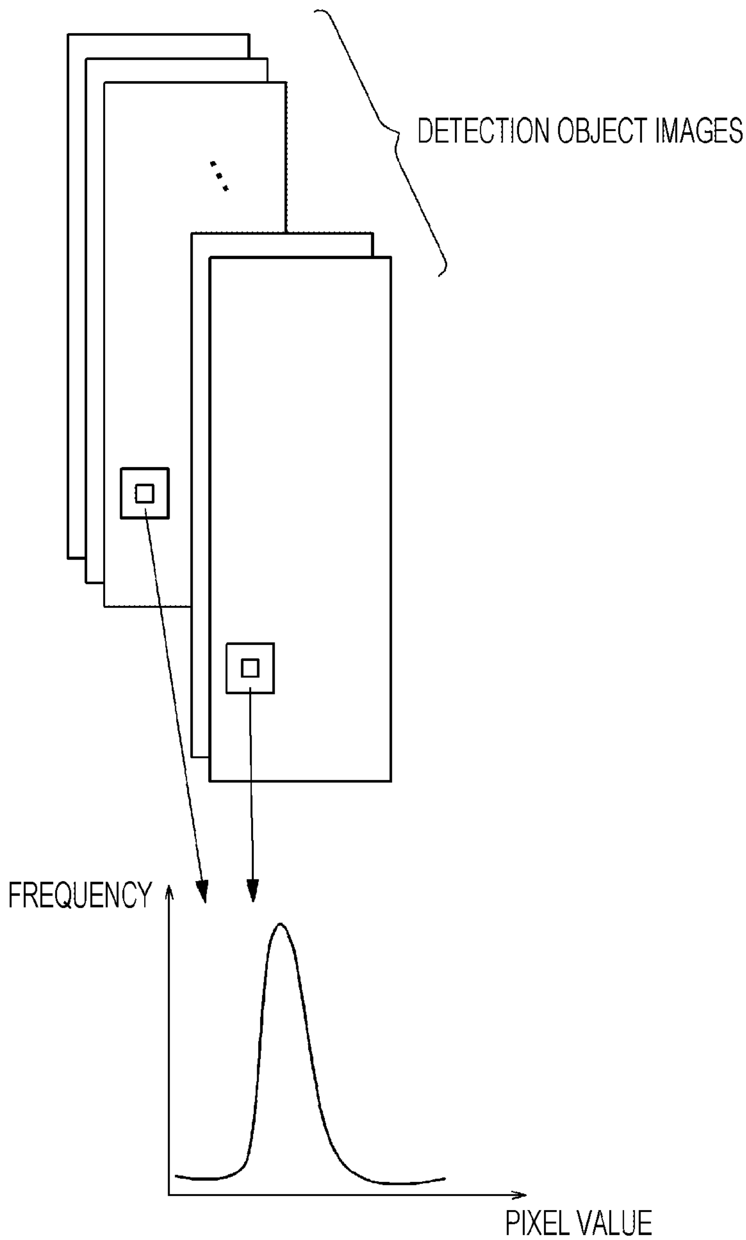
FIG. 4 is a diagram for explaining a method for creating another statistical model for the calculation of the degree of contribution performed by the control unit of FIG. 1.
Figure 5:
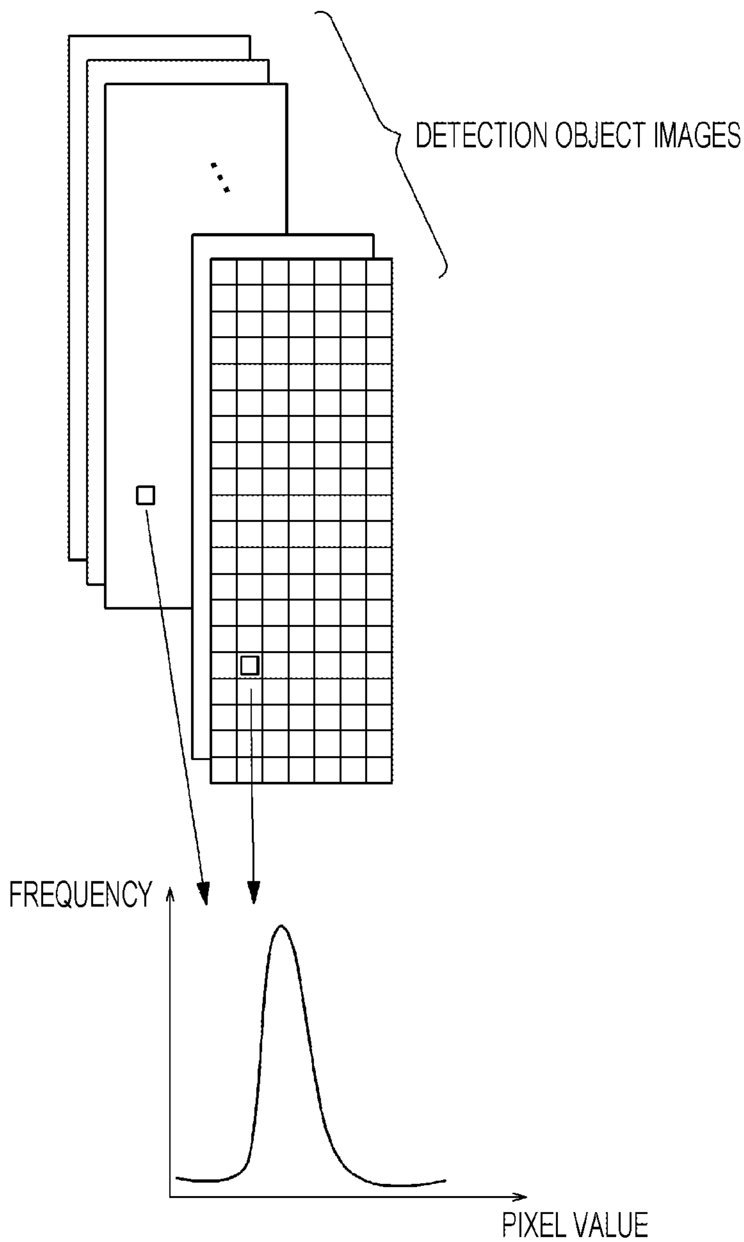
FIG. 5 is a diagram for explaining a method for creating yet another statistical model for the calculation of the degree of contribution performed by the control unit of FIG. 1.

As illustrated in FIG. 3, the pixels at the addresses corresponding to each other may be only the pixels positioned at the same address among the images. Alternatively, as illustrated in FIG. 4, the pixels at the addresses corresponding to each other may be a plurality of pixels included in, for example, a three-by-three pixel region around the same address. Alternatively, as illustrated in FIG. 5, the pixels at the addresses corresponding to each other may be a plurality of pixels in a section including the same address out of sections made by dividing each image into a plurality of grids. The plurality of detection object images including the aforementioned plurality of processed images may be considered to obtain the statistic.

For example, the control unit 18 may perform the disturbance determination on each of the pixels in each of the images included in the image group corresponding to a single disturbance factor, thereby to generate the representative image ri. Herein, the single disturbance factor is considered to influence the pixel values of all the images subjected to the disturbance determination. Thus, the single disturbance factor is not regarded as the disturbance in the images subjected to the disturbance determination. The disturbance determination performed herein determines whether a suddenly occurring disturbance is produced in each of the images included in the image group corresponding to the determined disturbance factor. For example, the control unit 18 creates a histogram for the pixel values of the pixels at the addresses corresponding to each other among the images to determine that a pixel value is non-disturbance when the frequency of the pixel value is higher than or equal to a threshold. Alternatively, for example, the control unit 18 causes the pixel values of the pixels at the addresses corresponding to each other among the images to approximate a Gaussian distribution to determine that a pixel value is non-disturbance when probability density is higher than or equal to a threshold. Alternatively, the control unit 18 performs cluster classification on the pixel values of the pixels at the addresses corresponding to each other among the images by using a statistical model such as K-means or a Gaussian mixture distribution, thereby to determine the disturbance. The control unit 18 determines the statistic based on the pixel values determined to be non-disturbance as the pixel value of the images, thereby to generate the representative image ri. Examples of the statistic include, for example, an average, a mode, and a median.

For example, the control unit 18 selects a single detection object image from among the image group corresponding to the single disturbance factor based on the disturbance factor, thereby to generate the representative image ri. For example, the control unit 18 selects, as the representative image ri, a detection object image with which the difference in pixel value from the statistic based on the pixel values of the pixels at the addresses corresponding to each other is minimum.

For example, when extracting the plurality of image groups respectively corresponding to the plurality of disturbance factors, the control unit 18 determines the maximum disturbance factor in the comparative image out of the plurality of disturbance factors. The maximum disturbance factor may be determined with any method. Examples of the maximum disturbance factor include, for example, a disturbance factor for which the number of images included in the corresponding image group is the maximum, a disturbance factor for which the number of corresponding pixels is the maximum, and a disturbance factor that has occurred most recently. Based on the image group corresponding to the determined maximum disturbance factor, the control unit 18 calculates the statistic based on the pixel values determined to be non-disturbing or selects a single detection object image from among the image group, thereby to generate the representative image ri.

For example, when extracting the plurality of image groups respectively corresponding to the plurality of disturbance factors, the control unit 18 generates a plurality of first representative images for the plurality of image groups, respectively. The first representative images may be generated in the same manner as or in a similar manner to a manner in which the above-described representative image ri is generated based on the image group corresponding to the single disturbance factor. The control unit 18 may replace the plurality of detection object images in the above-described method for generating the representative image ri based on the plurality of detection object images with the plurality of first representative images, thereby to generate the representative image ri. For example, the control unit 18 may generate by determining, as the pixel value, the statistic based on the pixel values of the pixels at the same address of each of the plurality of first representative images.

For example, in each of the plurality of image groups respectively corresponding to the plurality of disturbance factors, the control unit 18 calculates a plurality of statistics based on the pixel values of the pixels at the addresses corresponding to each other. The control unit 18 determines the pixel value of each pixel based on the plurality of statistics, thereby to generate the representative image ri. For example, when a subset of the plurality of statistics is common in the case where the plurality of statistics is for the pixels at the addresses corresponding to each other and respectively corresponds to the plurality of image groups, the control unit 18 may determine the common statistics as the pixel values of the pixels. The fact that the subset of the plurality of statistics is common may mean not only coincidence of the statistics but also inclusion of the statistics within a predetermined range. Examples of the statistic include, for example, an average, a mode, and a median.

As described above, the control unit 18 compares the generated representative image ri with the partial region of the entire image wi, thereby to perform the similarity determination. The control unit 18 may compare the pixel values of at least a subset of pixels out of all the pixels included in the generated representative image ri with the pixel values of the pixels at the same address as the pixels in the partial region of the entire image wi, thereby to perform the similarity determination.

The control unit 18 may compare all the pixels included in the generated representative image ri with all the pixels in the partial region of the entire image wi.

The control unit 18 may select the pixel used in the comparison with the entire image wi from among the plurality of pixels included in the generated representative image ri. For example, the control unit 18 may determine a feature such as an edge or an angle in the representative image ri as the pixel used in the comparison.

The control unit 18 may perform the similarity determination with the degree of contribution calculated for each of the plurality of pixels included in the representative image ri or each of the plurality of pixels included in the partial region of the entire image wi. The degree of contribution is an index indicating the degree to which the corresponding pixels contribute to the similarity determination. The control unit 18 may calculate the degree of contribution based on the statistic of at least part of the template image group. At least the subset of the template images used to calculate the degree of contribution may be the image group used to generate the representative image ri. At least the subset of the template images used to calculate the degree of contribution may be at least a subset of the image groups corresponding to the disturbance factors other than the single disturbance factor selected from among the plurality of disturbance factors determined for the entire image wi.

For calculating the degree of contribution, the control unit 18 creates, for example, for the pixel at each address in at least a subset of the plurality of detection object images of the template image group, a statistical model such as a histogram or a Gaussian distribution of the pixel value of at least one pixel corresponding to the address. As illustrated in FIG. 3, the at least one pixel corresponding to the address may be only the pixel positioned at this address. Alternatively, as illustrated in FIG. 4, the at least one pixel corresponding to the address may include the plurality of pixels included in, for example, the three-by-three pixel region around this address. Alternatively, as illustrated in FIG. 5, the at least one pixel corresponding to the address may include the plurality of pixels in the section including this address out of the sections made by dividing the detection object image into the plurality of grids. The plurality of detection object images including the aforementioned plurality of processed images may be considered to create the statistical model.

Figure 6:
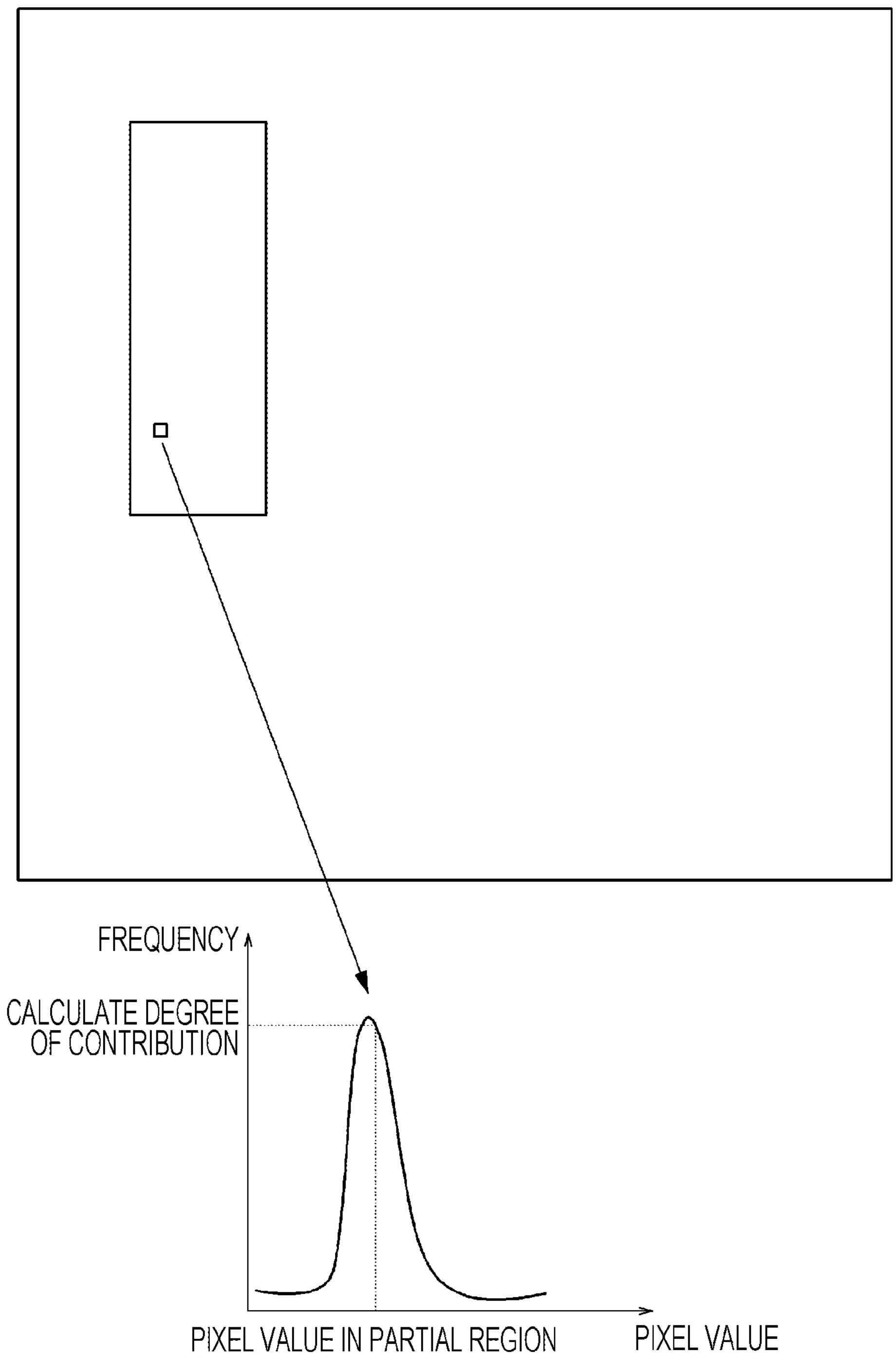
FIG. 6 is a diagram for explaining a method for calculating the degree of contribution based on the statistical model of FIG. 3.

The control unit 18 reads the frequency, in the statistical model of the pixel, corresponding to the pixel value of the pixel at the address in the partial region of the entire image wi corresponding to the pixel at each of the addresses used in the comparison determined as described above. As illustrated in FIG. 6, the control unit 18 calculates the degree of contribution in the pixel depending on the frequency. The degree of contribution may be calculated such that the degree of contribution increases depending on the frequency.

Based on the degree of contribution, the control unit 18 may select the pixel used in the similarity determination from among the plurality of pixels included in the representative image ri or the plurality of pixels included in part of the entire image wi corresponding to the pixel used in the comparison. For example, the control unit 18 uses a pixel having the degree of contribution greater than or equal to a threshold in the similarity determination.

Alternatively, the control unit 18 does not necessarily perform the analogy determination with the degree of similarity on a pixel having the degree of contribution smaller than or equal to the threshold. Specifically, for example, the control unit 18 does not necessarily perform the similarity determination when the pixel used in the comparison of the representative image ri has, in the corresponding statistical model, a pixel value of a low frequency or a pixel value out of a certain range around the pixel value of the maximum frequency. Alternatively, in the similarity determination, the control unit 18 may assign a weight depending on the degree of contribution. For example, the control unit 18 may multiply the difference between the pixels at the same address in the representative image ri and the partial region of the entire image wi by the weight varying depending on the degree of contribution.

The control unit 18 may calculate the degree of similarity by adding up the differences between the pixels included in the generated representative image ri and the pixels in the partial region of the entire image wi at the same addresses as the addresses of the pixels included in the generated representative image ri. The control unit 18 may determine the partial region of the entire image wi having the degree of similarity smaller than or equal to a threshold as the presence position of the detection object 14.

Alternatively, to calculate the degree of contribution, the control unit 18 does not necessarily perform the analogy determination with the degree of similarity when a specific condition is satisfied by using the created statistical model of the pixels. In this case, the partial region of the entire image wi may be determined to be dissimilar to the representative image. The specific condition refers to a case where, among all the pixels used in the comparison in the partial region, many pixels have low-frequency pixel values or many pixels have the pixel values out of a certain range around a modal pixel value in the corresponding statistical model.

Regarding the pixel value, for example, when the frequency of the pixel value of the pixel is smaller than or equal to a threshold in the statistical model corresponding to each of the pixels, this pixel value may be determined to be a low-frequency pixel value. For example, in a statistical model approximating a Gaussian model, when the frequency of the pixel value of the pixel is positioned out of a certain range around the modal pixel value, this pixel value may be determined to be out of a certain range around the modal pixel value. When the statistical model approximates by a Gaussian mixture model, the certain range may be set in, for example, a $\pm 6\sigma$ range around the modal of the Gaussian distribution.

The state in which many pixels have low-frequency pixel values among all the pixels may be a state in which the number of pixels having low-frequency pixel values is smaller than or equal to a threshold. Alternatively, the state in which many pixels have low-frequency pixel values among all the pixels may be a state in which the ratio of the pixels having low-frequency pixel values to all the pixels used in the comparison is smaller than or equal to a threshold.

As has been described, when detecting the presence position of the detection object 14 in the entire image wi, the control unit 18 includes an image portion of the partial region of the entire image wi corresponding the presence position in the template image group as the detection object image and stores this detection object image to the memory 17. When the disturbance factor is determined based on the operation input detected by the input unit 19, and the presence position of the detection object 14 is detected in the entire image wi, the control unit 18 may associate the situation causing influence in appearance to be exerted with the detection object image corresponding to the presence position and include this detection object image in the template image group.

Figure 7:
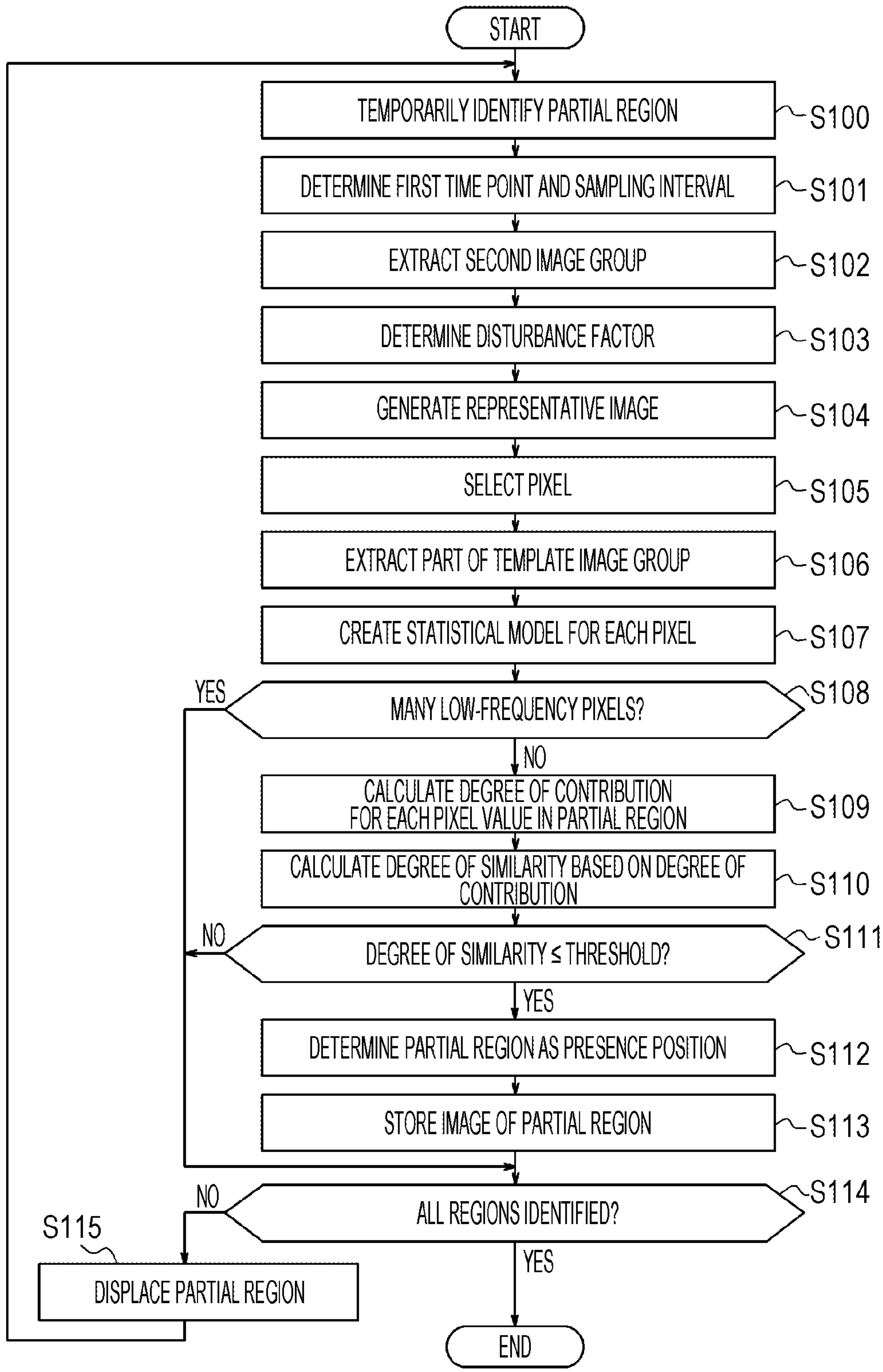
FIG. 7 is a flowchart for explaining a process of detecting the presence position executed by the control unit in the first embodiment.

In the first embodiment, a process of detecting the presence position executed by the control unit 18 is described with reference to a flowchart of FIG. 7. The process of detecting the presence position starts with acquisition of a single frame of the entire image wi.

In step S100, the control unit 18 temporarily identifies, in the acquired entire image wi, the partial region having the same size as the size of the detection object image included in the template image group as a region for the similarity determination. After the identification, the process proceeds to step S101.

In step S101, the control unit 18 determines the first time point and the sampling period based on the detection at the input unit 19 or the analysis of each of the detection object images included in the template image group. After the determination, the process proceeds to step S102.

In step S102, the control unit 18 extracts the second image group based on the first time point and the sampling intervals having been determined in step S101. After the extraction, the process proceeds to step S103.

In step S103, the control unit 18 determines the disturbance factor based on the input designating the situation to the input unit 19 or the analysis of the second image group. After the determination, the process proceeds to step S104.

In step S104, the control unit 18 generates the representative image ri based on the image group that is extracted from the second image group having been extracted in step S102 and corresponds to the disturbance factor having been determined in step S103. After the generation of the representative image ri, the process proceeds to step S105.

In step S105, the control unit 18 selects the pixel in the representative image ri having been generated in step S104. The selected pixel is used in the comparison with the partial region having been identified in step S100. After the selection of the pixel, the process proceeds to step S106.

In step S106, the control unit 18 extracts part of the template image group. After the extraction, the process proceeds to step S107.

In step S107, the control unit 18 creates the statistical model for each of the pixels of the plurality of detection object images having been extracted in step S106. After the creation of the statistical model, the process proceeds to step S108.

In step S108, the control unit 18 determines whether there are many pixels having low-frequency pixel values by using the statistical model having been created in step S107. When there are not many pixels of low-frequency, the process proceeds to step S109. When there are many pixels of low-frequency, the process proceeds to step S114.

In step S109, the control unit 18 reads, from the statistical model having been created in step S107, the frequencies corresponding to the pixel values of the pixels included in the partial region having been identified in step S100, thereby to calculate the degree of contribution. After the calculation of the degree of contribution, the process proceeds to step S110.

In step S110, the control unit 18 calculates the degree of similarity of the partial region having been identified in step S100 to the representative image ri based on the degree of contribution having been calculated in step S109. After the calculation of the degree of similarity, the process proceeds to step S111.

In step S111, the control unit 18 determines whether the degree of similarity having been calculated in step S110 is smaller than or equal to the threshold. When the degree of similarity is smaller than or equal to the threshold, the process proceeds to step S112. When the degree of similarity is not smaller than or equal to the threshold, the process proceeds to step S114.

In step S112, the control unit 18 determines the partial region having been identified in step S100 as the presence position of the detection object 14. After the determination, the process proceeds to step S113.

In step S113, the control unit 18 stores the image of the partial region having been identified in step S100 to the memory 17 so as to include the image of the partial region in the template image group as the detection object image. After the storing, the process proceeds to step S114.

In step S114, the control unit 18 determines whether all the regions of the entire image wi has been identified as the partial regions. When not all the regions have been identified, the process proceeds to step S115. When all the regions have been identified, the process of detecting ends.

In step S115, the control unit 18 performs displacement from the partial region having been identified in step S100 without changing the size. After the displacement, the process returns to step S100.

In the first embodiment, the image processing device 10 including the configuration as described above acquires the representative image ri based on the part of the template image group and performs the similarity determination between the at least part of the entire image wi and the representative image ri. With such a configuration, the image processing device 10 can generate the representative image ri by including the detection object image including the high-incidence disturbance. Accordingly, the image processing device 10 can include the influence of the high-incidence disturbance in the representative image ri even when the highly frequently occurring disturbance is generally a disturbance. Thus, even when the entire image wi is influenced by this disturbance, the image processing device 10 can determine whether the subject recorded in the entire image wi is taken as the detection object 14. As a result, even when the incidence of the disturbance is high, the image processing device 10 can detect the detection object 14 continuously and robustly by using a comparatively small number of images for leaning, in other words, an image group.

In the first embodiment, the image processing device 10 stores the detection object image of the detection object 14 detected in the entire image wi to the memory 17 so as to include the detection object image in the template image group. With such a configuration, the image processing device 10 can reflect a tendency of the disturbance that influences the entire image wi with a high probability in the representative image ri in the detection of the presence position of the detection object 14 to be performed later. Accordingly, the image processing device 10 can improve the robustness in detection in the detection of the presence position of the detection object 14 to be performed later.

In the first embodiment, out of the detection object images included in the template image group, the image processing device 10 generates the representative image ri based on the second image group including the plurality of images acquired at the sampling intervals out of the first image group including the plurality of images acquired along a time series from the gone back first time point. With such a configuration, the image processing device 10 determines the first time point depending on the maximum period of the occurrences out of disturbances exerting influence at the time of capturing the entire image wi, and accordingly, the image processing device 10 can reflect the disturbance that probably influences the entire image wi in the representative image ri. The image processing device 10 determines the sampling intervals depending on the minimum period of the occurrences out of the disturbances exerting influence at the time of capturing the entire image wi, and accordingly, the image processing device 10 can generate an appropriate representative image ri by using a subset of the detection object images without using all the detection object images included in the template image group. Accordingly, the image processing device 10 can reduce a load for processing for the generation of the representative image ri. Thus, the image processing device 10 can reduce a load related to the detection of the presence position of the detection object 14.

In the first embodiment, the image processing device 10 determines at least one disturbance factor exerting the same or a similar influence in appearance on the detection object 14 included in the plurality of entire images wi, extracts the image group corresponding to the disturbance factor from the second image group, and creates the representative image ri based on the image group corresponding to the disturbance factor. With such a configuration, the image processing device 10 can reflect the disturbance that highly probably influences the acquired representative image ri in the representative image ri. Accordingly, the image processing device 10 can further improve the robustness in detecting the detection object 14.

In the first embodiment, the image processing device 10 determines, for the operation input of the situation occurring at a time of exerting influence in appearance on the detection object 14, the disturbance factor based on the detection object image associated with the situation in the template image group, and, when detecting the presence position of the detection object 14 in the entire image wi, includes the image of the presence position in the template image group while associating the situation with the image of the presence position. With such a configuration, the image processing device 10 can clearly reflect the occurring disturbance factor in the representative image ri. Accordingly, the image processing device 10 can further improve the robustness in detecting the detection object 14.

In the first embodiment, the image processing device 10 selects the pixel used in the comparison with the entire image wi from among the plurality of pixels included in the representative image ri. With such a configuration, the image processing device 10 can reduce the load for processing the similarity determination compared to a configuration in which all the pixels of the representative image ri are used in the comparison with the partial region of the entire image wi.

In the first embodiment, the image processing device 10 determines, as the pixel value of the pixel, the statistic based on the pixel value of the pixel at the same address in each of the image groups corresponding to the disturbance factor, thereby to generates the representative image ri. With such a configuration, the image processing device 10 can eliminate influence of the pixel value that can be regarded as the disturbance in the image group corresponding to the disturbance factor, in other words, the pixel value exhibiting a low incidence in the image group. Accordingly, the image processing device 10 can further improve the robustness in detecting the detection object 14.

In the first embodiment, the image processing device 10 calculates the degree of contribution of part of the entire image wi used in the similarity determination based on the statistic of the detection object images of at least part of the template image group and uses the calculated degree of contribution for the similarity determination. With such a configuration, the image processing device 10 can reduce the possibility of a result of the similarity determination on the pixel of a low degree of contribution being identified as the pixel of high similarity. Accordingly, when a disturbance not occurring in the template image group occurs in the entire image wi, the image processing device 10 can eliminate the influence of the disturbance in the similarity determination. Accordingly, the image processing device 10 can further improve the robustness in detecting the detection object 14.

In the first embodiment, in the image processing device 10, at least part of the template image group used in the calculation of the degree of contribution is the image group used in the generation of the representative image ri. With such a configuration, when a disturbance not reflected in the representative image ri occurs in the entire image wi, the image processing device 10 can eliminate the influence of the disturbance in the similarity determination. Accordingly, the image processing device 10 can further improve the robustness in detecting the detection object 14.

In the first embodiment, in the image processing device 10, the at least part of the template image group used to calculate the degree of contribution is at least a subset of the image groups corresponding to the disturbance factors other than the selected single disturbance factor from among the plurality of disturbance factors determined for the entire image wi. With such a configuration, when a disturbance factor not reflected in the representative image ri and with the possibility of occurring occurs in the entire image wi, the image processing device 10 can eliminate the influence of the disturbance factor not reflected in the representative image ri in the similarity determination. Accordingly, the image processing device 10 can further improve the robustness in detecting the detection object 14.

Although the representative image ri is generated based on the image group corresponding to the disturbance factor extracted from the second image group in the first embodiment, this is not limiting. The representative image ri may be generated from the second image group without identifying the image group corresponding to the disturbance factor.

In a second embodiment of the present disclosure, the image processing device is described. In the second embodiment, the image group is extracted from the template image group at the control unit 18 with a method different from the method in the first embodiment. Hereinafter, the second embodiment is described by mainly describing differences from the first embodiment. Portions including the same configurations as those in the first embodiment are denoted by the same reference numerals.

As illustrated in FIG. 1, in the second embodiment, the image processing device 10 includes the communication unit 16, the memory 17, and the control unit 18 as in the first embodiment. As in the first embodiment, the image processing device 10 may include the input unit 19. In the second embodiment, the communication unit 16, the memory 17, and the input unit 19 include the same configurations and the same functions as those in the first embodiment. In the second embodiment, the control unit 18 includes the same configuration as that in the first embodiment.

In the second embodiment, unlike the first embodiment, the control unit 18 directly extracts the image group corresponding to the disturbance factor from the template image group without extracting the second image group from the template image group. As in the first embodiment, the detection object image which has been detected in presence position within the predetermined period of time going back from the present time and which has been included in the template image group may be the detection object image in the entire image wi of at least one frame. Alternatively, a plurality of such detection object images may be in the entire images wi of the plurality of frames, respectively. The disturbance factors in the plurality of detection object images may be the same or similar to each other.

In the second embodiment, the control unit 18 may generate the representative image ri based on the image group corresponding to the disturbance factor extracted from the template image group unlike the first embodiment. The method for generating the representative image ri based on the image group corresponding to the disturbance factor may be similar to the method for generating in the first embodiment.

In the second embodiment, as in the first embodiment, the control unit 18 compares the generated representative image ri with the partial region of the entire image wi, thereby to perform the similarity determination. Accordingly, the control unit 18 may compare all the pixels included in the generated representative image ri with all the pixels in the partial region of the entire image wi. Alternatively, the control unit 18 may select the pixel used in the comparison with the entire image wi from among the plurality of pixels included in the generated representative image ri. The control unit 18 may perform the similarity determination with the degree of contribution calculated for each of the pixels included in the partial region of the entire image wi.

Figure 8:
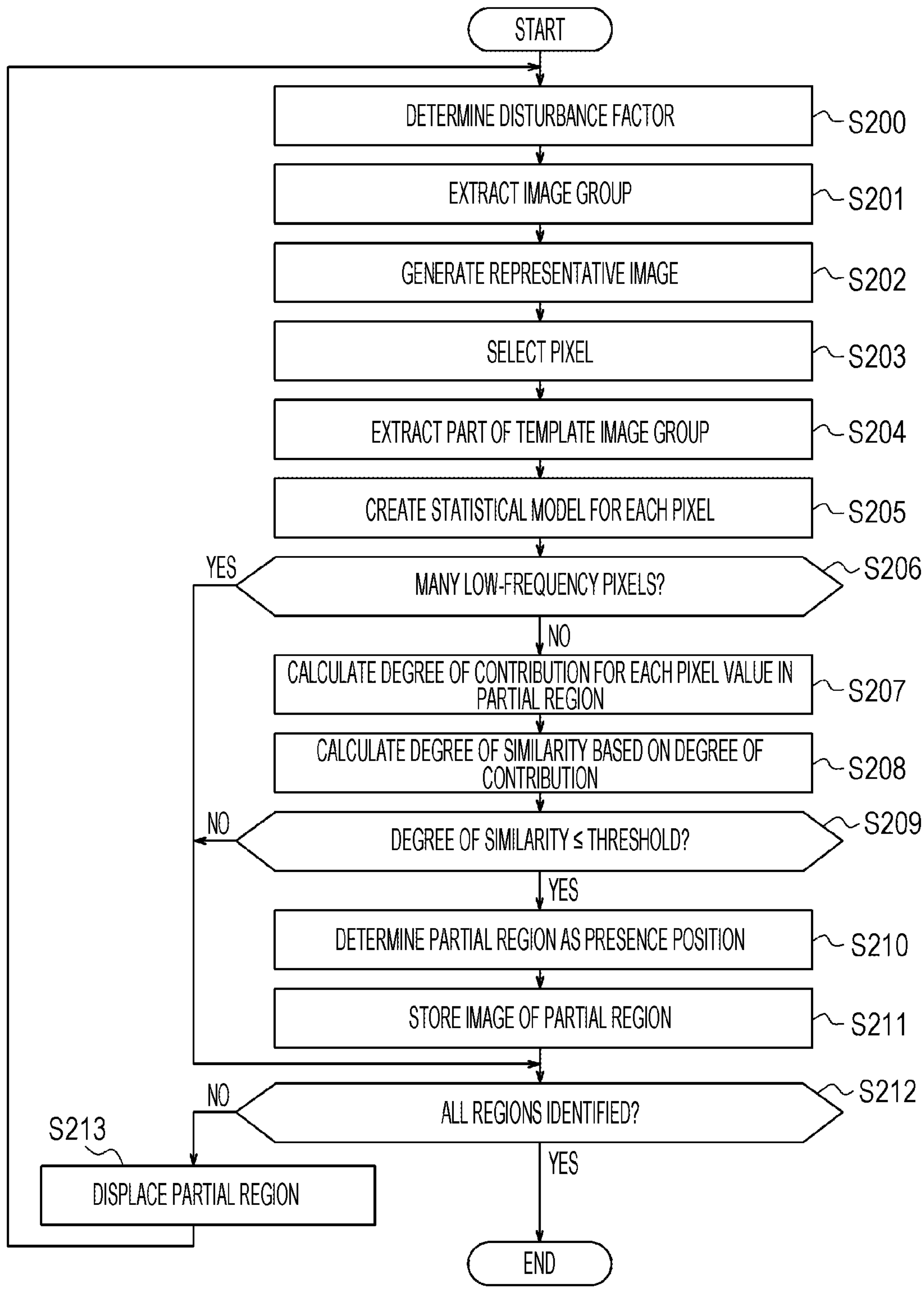
FIG. 8 is a first flowchart for explaining the process of detecting the presence position executed by the control unit in a second embodiment.

In the second embodiment, the process of detecting the presence position executed by the control unit 18 is described with reference to a flowchart of FIG. 8. The process of detecting the presence position starts with acquisition of a single frame of the entire image wi.

In step S200, the control unit 18 determines the disturbance factor based on the input designating the situation to the input unit 19 or the analysis of the detection object image that has been detected in presence position from the entire image wi within the predetermined period of time going back from the present time and included in the template image group. After the determination, the process proceeds to step S201.

In step S201, the control unit 18 extracts the image group corresponding to the disturbance factor having been determined in step S200 from the template image group. After the extraction, the process proceeds to step S202.

In steps S202 to S213, the control unit 18 performs similar processing to the processing in steps S104 to S115 in the process of detecting in the first embodiment.

Also in the second embodiment, the image processing device 10 including the configuration as described above generates the representative image ri based on the partial image group extracted from the template image group and performs the similarity determination between part of the entire image wi and the representative image ri, thereby to detect the presence position of the detection object 14 in the entire image wi. Accordingly, even when the incidence of the disturbance is high, the image processing device 10 can detect the detection object 14 continuously and robustly by using a comparatively small number of images for leaning, in other words, the image group.

In a third embodiment of the present disclosure, the image processing device is described. In the third embodiment, the image group is extracted from the template image group at the control unit 18 with a method different from the method in the first embodiment. Hereinafter, the third embodiment is described by mainly describing differences from the first embodiment. Portions including the same configurations as those in the first embodiment are denoted by the same reference numerals.

As illustrated in FIG. 1, in the third embodiment, the image processing device 10 includes the communication unit 16, the memory 17, and the control unit 18 as in the first embodiment. As in the first embodiment, the image processing device 10 may include the input unit 19. In the third embodiment, the communication unit 16, the memory 17, and the input unit 19 include the same configurations and the same functions as those in the first embodiment. In the third embodiment, the control unit 18 includes the same configuration as that in the first embodiment.

In the third embodiment, unlike the first embodiment, the control unit 18 extracts any image group from the template image group not limited to the second image group or the image group corresponding to the disturbance factor. The control unit 18 may generate the representative image ri based on the extracted image group. The method for generating the representative image ri based on the extracted image group may be similar to the method for generating the representative image ri based on the second image group in the first embodiment.

In the third embodiment, as in the first embodiment, the control unit 18 compares the generated representative image ri with the partial region of the entire image wi, thereby to perform the similarity determination. Accordingly, the control unit 18 may compare all the pixels included in the generated representative image ri with all the pixels in the partial region of the entire image wi. Alternatively, the control unit 18 may select the pixel used in the comparison with the entire image wi from among the plurality of pixels included in the generated representative image ri. In the third embodiment, the control unit 18 calculates the degree of contribution to be calculated for each of the pixels included in the partial region of the entire image wi based on the statistic of at least part of the template image group and uses the calculated degree of contribution to perform the similarity determination.

Figure 9:
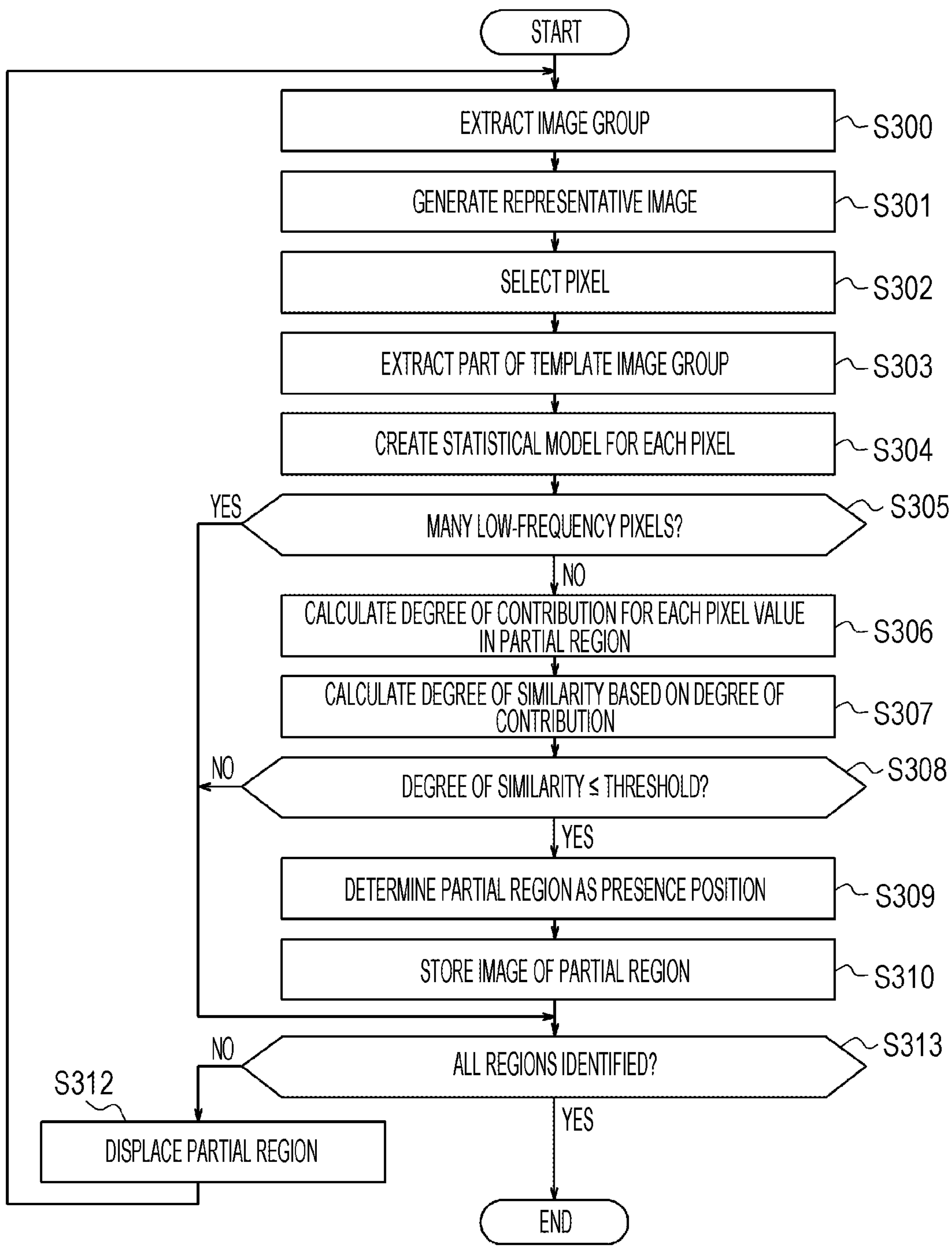
FIG. 9 is a first flowchart for explaining the process of detecting the presence position executed by the control unit in a third embodiment.

In the third embodiment, the process of detecting the presence position executed by the control unit 18 is described with reference to a flowchart of FIG. 9. The process of detecting the presence position starts with acquisition of a single frame of the entire image wi.

In step S300, the control unit 18 extracts the image group determined in any manner from the template image group. After the extraction, the process proceeds to step S301.

In steps S301 to S312, the control unit 18 performs similar processing to the processing in steps S104 to S115 in the process of detecting in the first embodiment.

In the third embodiment, when the image processing device 10 generates the representative image ri based on the partial image group extracted from the template image group and performs the similarity determination between the part of the entire image wi and the representative image ri to detect the presence position of the detection object 14 in the entire image wi, the image processing device 10 including the configuration as described above calculates the degree of contribution of the part of the entire image wi used in the similarity determination based on the statistic of the at least part of the template image group and uses the calculated degree of contribution for the similarity determination. With such a configuration, when a disturbance not reflected in the representative image ri occurs in the entire image wi, the image processing device 10 can eliminate the influence of the disturbance in the similarity determination. Accordingly, the image processing device 10 can further improve the robustness in detecting the detection object 14.

In the embodiments, the image processing device 10 has been described. In addition to a method or a program for embodying the device, the embodiments of the present disclosure can take an embodying form as a recording medium (for example, an optical disc, a magneto-optical disc, a CD-ROM, a CD-R, a CD-RW, magnetic tape, a hard disk drive, a memory card, or the like) in which the program is recorded.

A form of implementing the program is not limited to an application program such as an object code compiled by a complier, a program code executed by an interpreter, or the like but is a program module or the like incorporated in an operating system. All the processes of the program may be performed only in a CPU on a control board, or not all the processes are necessarily performed only in the CPU on the control board. Part or the entirety of the program may be performed in an expansion board added to the board according to need or another processing unit implemented in an expansion unit.

The drawings illustrating the embodiments of the present disclosure are schematic. The ratios of dimensions or the like in the drawings do not necessarily agree with the actual ratios of dimensions or the like.

Although the embodiments of the present disclosure have been described based on the drawings and examples, it is to be noted that one skilled in the art can make various modifications or changes based on the present disclosure. Accordingly, it is noted that these modifications or changes are included in the scope of the present disclosure. For example, functions or the like included in individual components or the like can be relocated so as to be logically consistent, and a plurality of components or the like can be combined into a single unit or divided.

All the elements described in the present disclosure and/or all the disclosed method or steps of the process disclosed in the present disclosure can be combined with each other in any combination unless the features of these are mutually exclusive in the combination. In the present disclosure, each of the described features can be replaced with an alternative feature operable for the same purpose, an equivalent purpose, or a similar purpose unless explicitly denied. Accordingly, each of the disclosed features is merely an example of a series of the same or equivalent generic features unless explicitly denied.

None of the embodiments of the present disclosure is limited to any specific configuration of the above-described embodiments. The embodiments of the present disclosure can be expanded to all the novel features described in the present disclosure or a combination of these, or all the novel method or steps of the process described herein or a combination of these.

In the present disclosure, the descriptions such as "first" and "second" are identifiers for distinguishing corresponding configurations. In the present disclosure, the configurations distinguished by the descriptions of "first", "second", and the like can exchange the numbers in the configurations. For example, the first time point and a second time point can exchange the identifiers "first" and "second" with each other. The exchange of the identifiers is performed simultaneously. The configurations are still distinguished after the exchange of the identifiers. The identifiers may be deleted. Reference numerals are used to distinguish the configurations from which the identifiers have been deleted. In the present disclosure, it is not allowed to interpret the order of the configurations based only on the descriptions of the identifiers such as "first" and "second" or to utilize the descriptions of the identifiers as only the reason for existence of an identifier with a small number.

REFERENCE SIGNS

10 image processing device
11 object operation system
12 camera
13 operation machine
14 detection object
15 tray
16 communication unit
17 memory
18 control unit
19 input unit
ri representative image
wi entire image

The invention claimed is:

1. An image processing device comprising:
- a memory configured to store a template image group comprising a plurality of images of a detection object;
- a communication interface configured to acquire an entire image comprising a matching object; and
- one or more processors configured to acquire a representative image based on part of the template image group and perform similarity determination between at least a part of the entire image and the representative image,
- wherein the one or more processors
- calculates a degree of contribution of part of the entire image used in the similarity determination based on a statistic of at least part of the template image group, and
- uses the degree of contribution in the similarity determination.

2. The image processing device according to claim 1, wherein the one or more processors stores a detected image of the detection object detected in the entire image to the memory, the one or more processors causing the detected image to be comprised in the template image group.

3. The image processing device according to claim 1,
- wherein the one or more processors generates the representative image based on a second image group in the template image group, the second image group comprising a plurality of images acquired at a sampling interval out of a first image group, the first image group comprising a plurality of images acquired along a time series from a first time point gone back to a past out of the plurality of images comprised in the template image group.

4. The image processing device according to claim 3, further comprising:

an input interface configured to detect input of at least one selected from the group consisting of the first time point and the sampling interval, wherein the one or more processors determines the at least one selected from the group consisting of the first time point and the sampling interval based on the input detected by the input interface.

5. The image processing device according to claim 1, wherein the one or more processors determines at least one disturbance factor exerting a same or similar influence in appearance on the detection object comprised in one or more entire images, extracts an image group corresponding to the disturbance factor from the template image group, and creates the representative image based on the image group corresponding to the disturbance factor.

6. The image processing device according to claim 3, wherein the one or more processors determines at least one disturbance factor exerting a same or similar influence in appearance on the detection object comprised in one or more entire images, extracts an image group corresponding to the disturbance factor from the second image group, and creates the representative image based on the image group corresponding to the disturbance factor.

7. The image processing device according to claim 5, further comprising:

an input interface configured to detect input of a situation occurring at a time of exerting the influence on the detection object comprised in the entire image, wherein the one or more processors determines the disturbance factor based on an image in the template image group with which the situation is associated, and, when detecting a presence position of the detection object in the entire image, the one or more processors causes an image of the presence position to be comprised in the template image group while associating the image of the presence position with the situation.

8. The image processing device according to claim 1, wherein the one or more processors selects a pixel used in comparison with the entire image from among a plurality of pixels comprised in the representative image.

9. The image processing device according to claim 5, wherein the one or more processors generates the representative image by determining a statistic based on a pixel value of a pixel at a same address in each of the image groups corresponding to the disturbance factor as a pixel value of the pixel of the representative image.

10. The image processing device according to claim 5, wherein the one or more processors generates the representative image by selecting a single image based on the disturbance factor from among the image group corresponding to the disturbance factor.

11. The image processing device according to claim 5, wherein the one or more processors generates the representative image by determining one or more disturbance factors for the entire image, extracting one or more image groups respectively corresponding to the one or more disturbance factors, generating a plurality of first representative images representatively for the one or more image groups, and determining a statistic based on a pixel value of a pixel at a same address in each of the plurality of first representative images as a pixel value of the pixel of the representative image.

12. The image processing device according to claim 5, wherein the one or more processors generates the representative image by determining one or more disturbance factors for the entire image, extracting one or more image groups respectively corresponding to the one or more disturbance factors, calculating one or more statistics, the one or more statistics each being based on a pixel value of a pixel at a same address in each of the one or more image groups, and determining a pixel value of the pixel of the representative image based on the one or more statistics.

13. The image processing device according to claim 5, wherein the part of the entire image comprises pixels, the one or more processors calculating the degree of contribution for each of the pixels comprised in the part of the entire image, and the one or more processors selects, based on the degree of contribution, a pixel to be used in the similarity determination from among the pixels comprised in the part.

14. The image processing device according to claim 13, wherein the part of the entire image comprises pixels, the one or more processors calculating the degree of contribution for each of the pixels comprised in the part of the entire image, and, in the similarity determination, the one or more processors assigns a weight depending on the degree of contribution calculated for each of the pixels.

15. The image processing device according to claim 13, wherein the at least part of the template image group used to calculate the degree of contribution is the image group used to generate the representative image.

16. The image processing device according to claim 13, wherein the at least part of the template image group used to calculate the degree of contribution is at least part of an image group corresponding to a disturbance factor other than the single disturbance factor selected from among the one or more disturbance factors determined for the entire image.

17. An image processing method comprising:

storing a template image group comprising a plurality of images of a detection object;

acquiring an entire image comprising a matching object;

acquiring a representative image based on part of the template image group, and performing similarity determination between at least a part of the entire image and the representative image;

calculating a degree of contribution of part of the entire image used in the similarity determination based on a statistic of at least part of the template image group; and using the degree of contribution in the similarity determination.

* * * * *